(12) United States Patent
Zahavi et al.

(10) Patent No.: US 11,663,325 B1
(45) Date of Patent: May 30, 2023

(54) MITIGATION OF PRIVILEGE ESCALATION

(71) Applicant: CyberArk Software Ltd., Petach-Tikva (IL)

(72) Inventors: Alon Zahavi, Petach-Tikva (IL); Nir Chako, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 17/713,687

(22) Filed: Apr. 5, 2022

(51) Int. Cl.
 *G06F 21/54* (2013.01)
 *G06F 21/55* (2013.01)
 *G06F 21/31* (2013.01)
 *G06F 21/53* (2013.01)
 *G06F 21/57* (2013.01)

(52) U.S. Cl.
 CPC .......... *G06F 21/54* (2013.01); *G06F 21/31* (2013.01); *G06F 21/53* (2013.01); *G06F 21/554* (2013.01); *G06F 21/577* (2013.01)

(58) Field of Classification Search
 None
 See application file for complete search history.

(56) References Cited

U.S. PATENT DOCUMENTS

| | | | | |
|---|---|---|---|---|
| 5,899,987 A * | 5/1999 | Yarom | ................. | G06F 21/126 707/999.005 |
| 6,266,773 B1 * | 7/2001 | Kisor | ................. | G06F 21/554 726/17 |
| 7,707,642 B1 * | 4/2010 | Herbach | ............. | G06F 21/6227 726/3 |
| 9,679,122 B1 * | 6/2017 | DeHaan | ................. | G06F 21/31 |
| 10,341,321 B2 * | 7/2019 | Kumar | .................... | H04L 63/08 |
| 10,747,875 B1 * | 8/2020 | Stoler | .................... | H04L 9/3247 |
| 11,062,004 B2 * | 7/2021 | Gordon | ................ | G06F 21/566 |
| 2008/0127292 A1 * | 5/2008 | Cooper | .............. | G06F 21/6281 718/1 |
| 2013/0269027 A1 * | 10/2013 | Bowman | ............. | G06F 21/6218 726/21 |
| 2016/0098572 A1 * | 4/2016 | Povalyayev | .......... | H04L 63/102 726/28 |
| 2017/0063930 A1 * | 3/2017 | Chesla | ................ | H04L 63/1425 |
| 2018/0239921 A1 * | 8/2018 | Goyal | ................ | G06F 21/6227 |
| 2018/0276383 A1 * | 9/2018 | Venkataramani | ....... | G06F 9/468 |
| 2019/0236312 A1 * | 8/2019 | Peuhkurinen | ........... | G06F 21/52 |
| 2019/0273754 A1 * | 9/2019 | Ting | ........................ | G06F 9/50 |
| 2020/0092294 A1 * | 3/2020 | Sharma | ................ | H04L 63/108 |
| 2020/0336503 A1 * | 10/2020 | Xu | ....................... | H04L 63/1425 |
| 2020/0412726 A1 * | 12/2020 | Nevatia | ................ | H04L 63/102 |

(Continued)

*Primary Examiner* — James R Turchen
(74) *Attorney, Agent, or Firm* — Finnegan, Henderson, Farabow, Garrett & Dunner, LLP.

(57) ABSTRACT

Disclosed embodiments relate to systems and methods for performing privileged computing actions. Techniques include receiving an indication of a request by an entity to perform a privileged computing operation; determining whether the entity is associated with a privilege needed to perform the privileged computing operation; accessing historical data indicating at least one series of events leading to the entity being associated with the privilege; determining whether the entity is properly associated with the privilege; causing the privileged computing operation to be performed by a secured processing element; and causing a result of the privileged computing operation performed by the secured processing element to be provided to the entity.

20 Claims, 5 Drawing Sheets

(56) References Cited

U.S. PATENT DOCUMENTS

| | | | |
|---|---|---|---|
| 2021/0051153 A1* | 2/2021 | Bogdanich Espina | ...................... H04L 63/105 |
| 2021/0081947 A1* | 3/2021 | Hockey | ................... G06F 21/62 |
| 2021/0409419 A1* | 12/2021 | Kraus | ................... H04L 63/105 |
| 2022/0188436 A1* | 6/2022 | Mika | ....................... G06F 21/45 |

* cited by examiner

MITIGATION OF PRIVILEGE ESCALATION

BACKGROUND

Technical Field

The present disclosure relates generally to cybersecurity and, more specifically, to techniques for securely performing a privileged computer operation using a secured processing element.

Background Information

In modern network-based environments, it is increasingly important for organizations and individuals alike to securely control which users and processes are authorized to perform sensitive operations. Many computer systems delegate authority to perform security-relevant functions through the use of privileges. For example, when a particular process running in a computer environment attempts to perform an action, the operating system checks to see if the process (or associated identity) is eligible to perform that action. If so, the operating system assigns to the process the necessary privileges so that it can perform these operations.

However, attackers are continually finding new ways to circumvent these privilege-based security measures. For example, through various forms of privilege escalation attacks, an attacker may exploit a bug or other flaw in an operating system or software application to gain elevated access to resources that normally require higher levels of privilege. Further, even when a process is properly entitled to permissions, an attacker may leverage the process using techniques such as code injection that will exploit the privileges to perform malicious actions.

In an attempt to address these security issues, many existing techniques rely on system administrator configurations or programing best-practices to reduce the risk of such attacks. For example, this may include the use of least-privilege principles or other similar principles when developing code or configuring a computing system. These processes, however, rely on the prudence of individuals, who are often prone to mistakes. Further, many existing techniques assume that processes with the appropriate privileges are legitimate, which may not be the case.

Accordingly, in view of these and other deficiencies in existing techniques, technological solutions are needed for reliably evaluating the privileges of a process (or associated identity) executing in an operating system and for securely carrying out privileged operations. In particular, solutions should advantageously consider not only whether the process is associated with the necessary privileges, but also whether the permissions were granted legitimately. Further, even when a privilege is verified, the requested privileged operation should be performed in a secure manner to avoid the privileged process from serving as a vector for attack.

SUMMARY

The disclosed embodiments describe non-transitory computer readable media, systems, and methods for securely performing privileged computing actions. For example, in an embodiment, a non-transitory computer readable medium may include instructions that, when executed by at least one processor, cause the at least one processor to perform operations for securely performing privileged computing actions. The operations may comprise receiving an indication of a request by an entity to perform a privileged computing operation; determining whether the entity is associated with at least one privilege needed to perform the privileged computing operation; based on a determination that the entity is associated with the at least one privilege, accessing historical data indicating at least one event leading to the entity being associated with the at least one privilege; determining, based on the historical data, whether the entity is properly associated with the at least one privilege; based on the determination that the entity is properly associated with the at least one privilege, causing the privileged computing operation to be performed by a secured processing element; and causing a result of the privileged computing operation performed by the secured processing element to be provided to the entity.

According to a disclosed embodiment, determining whether the entity is properly associated with the at least one privilege may include accessing a privilege management server.

According to a disclosed embodiment, determining whether the entity is properly associated with the at least one privilege may include validating the at least one event.

According to a disclosed embodiment, determining whether the entity is properly associated with the at least one privilege may include identifying at least one expected event not included in the historical data.

According to a disclosed embodiment, determining whether the entity is properly associated with the at least one privilege may include accessing at least one policy indicating an expected series of events leading to association with the privilege.

According to a disclosed embodiment, the historical data may include data stored in a database local to a system associated with the entity.

According to a disclosed embodiment, accessing the historical data may include accessing a system external to a system associated with the entity.

According to a disclosed embodiment, the system external to the system associated with the entity may be configured to assign the at least one privilege.

According to a disclosed embodiment, causing the privileged computing operation to be performed by the secured processing element may include providing at least one parameter associated with the privileged computing operation to the secured processing element.

According to a disclosed embodiment, the entity may be at least one of a user or a process executing on a computing device.

According to another disclosed embodiment, there may be a computer-implemented method for securely performing privileged computing actions. The method may comprise receiving an indication of a request by an entity to perform a privileged computing operation; determining whether the entity is associated with at least one privilege needed to perform the privileged computing operation; based on a determination that the entity is associated with the at least one privilege, accessing historical data indicating at least one series of events leading to the entity being associated with the at least one privilege; determining, based on the historical data, whether the entity is properly associated with the at least one privilege; based on a determination that the entity is properly associated with the at least one privilege, causing the privileged computing operation to be performed by a secured processing element; and causing a result of the privileged computing operation performed by the secured processing element to be provided to the entity.

According to a disclosed embodiment, the method may further comprise, based on a determination that the entity is improperly associated with the at least one privilege, denying the request.

According to a disclosed embodiment, the method may further comprise, based on a determination that the entity is improperly associated with the at least one privilege, terminating a process associated with the privileged computing operation.

According to a disclosed embodiment, the method may further comprise, based on a determination that the entity is improperly associated with the at least one privilege, generating an alert identifying the entity.

According to a disclosed embodiment, causing the privileged computing operation to be performed by a secured processing element may include causing the secured processing element to gain the at least one privilege.

According to a disclosed embodiment, the method may further comprise causing the secured processing element to lose the at least one privilege after performing the privileged computing operation.

According to a disclosed embodiment, causing the privileged computing operation to be performed by a secured processing element may include causing the secured processing element to gain at least one capability for performing the privileged computing operation.

According to a disclosed embodiment, the method may further comprise causing the secured processing element to lose the at least one capability after performing the privileged computing operation.

According to a disclosed embodiment, the secured processing element may be configured to execute in a virtual execution instance.

According to a disclosed embodiment, the indication of the request may be received from a dedicated module or a sandboxed program executing inside an operating system kernel.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor (s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for securely performing privileged computing actions described herein overcome several technological problems relating to security, efficiency, and performance in the fields of cybersecurity and network security. In particular, the disclosed embodiments provide techniques for improved validation of privileges of a user or process requesting to perform a privileged computing operation. As discussed above, attackers may leverage various security vulnerabilities in a computing environment to gain unauthorized privileges. Accordingly, from the operating system's perspective, a process may appear to have proper privileges, even though they were obtained maliciously. To address this, the disclosed systems may audit various historical data, either locally at the computing device or through external sources, to evaluate the events leading up to the privilege being obtained. This historical data will likely include one or more events indicating the privilege was obtained illegitimately, thus exposing the attacker.

Further, the disclosed embodiments may include mechanisms to reduce the attack surfaces through which the privileged processes may be exploited. In some cases, even if a process obtained a privilege legitimately, it may still represent an attack surface that attackers may target to perform malicious actions through code injection or other techniques. Through the disclosed techniques, once a privileged action is approved, a secured processing element may be initiated to take responsibility for performing the privileged operation. In particular, the secured processing element may provide a hardened, secure, and much more monitored environment than the original unsecured process. Accordingly, the unsecured process itself may never hold the heightened privileges and may only receive a result of the operation.

Further, any privileges that are assigned may be managed by a central system. Accordingly, any particular user of the system (including, e.g., a root user or any other admin user may not hold the permissions themselves. Rather, a process of approving a privileged action against the central management system may take place, thus reducing the risk of managing sensitive operations on local configuration files.

Reference will now be made in detail to the disclosed embodiments, examples of which are illustrated in the accompanying drawings.

Figure 1:
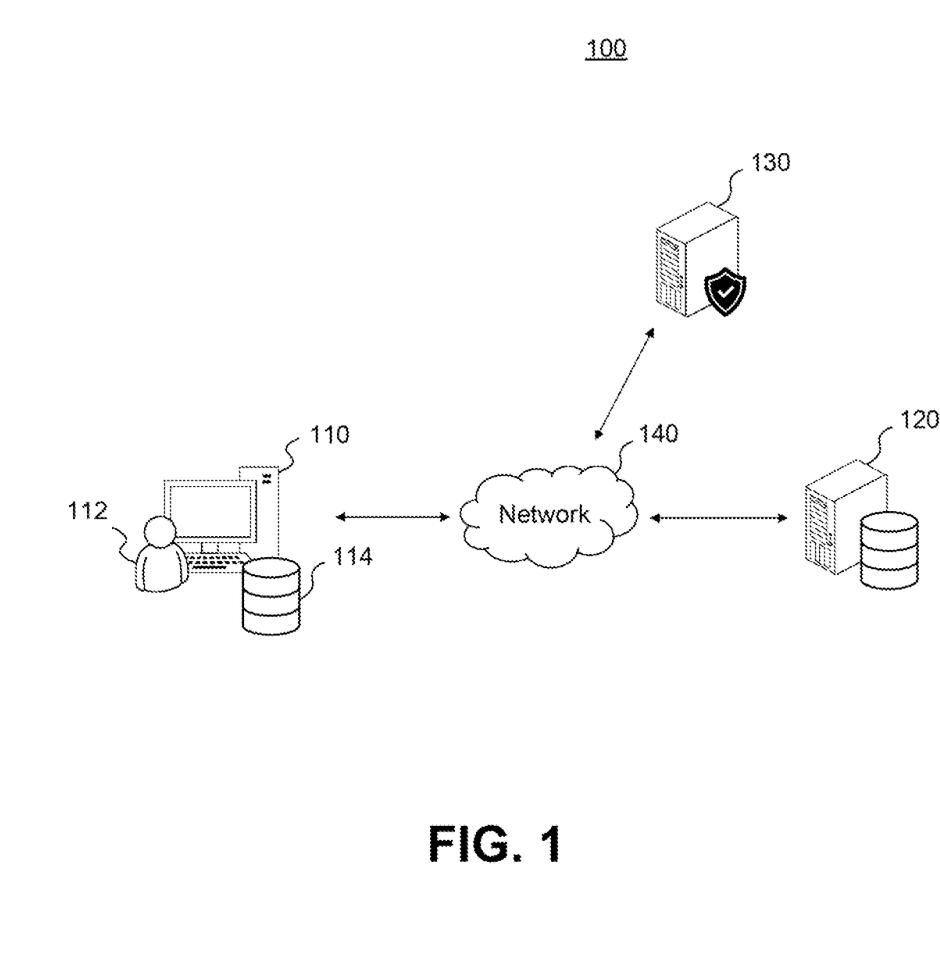
FIG. 1 illustrates an example system environment for securely performing privileged computing actions, consistent with the disclosed embodiments.

FIG. 1 illustrates an example system environment 100 for securely performing privileged computing actions, consistent with the disclosed embodiments. System environment 100 may include one or more computing devices 110, one or more target resources 120, and one or more security servers 130, as shown in FIG. 1. System environment 100 may represent a system or network environment in which various privileged computing operations may be performed. As used herein, a privileged computing operation may refer to any operation requiring the entity performing the operation to have or be associated with at least one security privilege to perform the operation. For example, computing device 110 (or an entity associated with computing device 110, such as identity 112) may request to perform a privileged computing operation within system environment 100. In some embodiments, this may include a network-based privileged computing operation. For example, this may include an operation involving a file or other data on target resource 120, or privilege management server 130. Alternatively or additionally, this may include a local privileged computing operation. For example, the local computing operation may be an operation involving a file stored in computing device 110 or database 114. Accordingly, while system environment 100 is shown in FIG. 1 to include target resource 120 and security server 130 separately from computing device 110 by way of example, in some embodiments, one or both of target resource 120 and security server 130 may be integrated with computing device 110. For example, target resource 120 may be a local resource of computing device 110 and security server 130 may be an agent or other process running on computing device 110. Accordingly, system 100 may not necessarily be a network-based system environment and may be a local environment of computing device 110.

The various components of system environment 100 may communicate over a network 140. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system environment 100 is shown as a network-based environment, it is understood that in some embodiments, one or more aspects of the disclosed systems and methods may also be used in a localized system, with one or more of the components communicating directly with each other.

As noted above, system environment 100 may include one or more computing devices 110. Computing device 110 may include any device that may be used for performing a privileged computing operation. Accordingly, computing device 110 may include various forms of computer-based devices, such as a workstation or personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may be capable of performing a privileged computing operation. In some embodiments, computing device 110 may be a virtual machine (e.g., based on AWS™, Azure™, IBM Cloud™, etc.), container instance (e.g., Docker™ container, Java™ container, Windows Server™ container, etc.), or other virtualized instance.

In some embodiments, computing device 110 may be associated with an identity 112. Identity 112 may be any entity that may be associated with one or more privileges to be asserted to perform a privileged computing operation. For example, identity 112 may be a user, an account, an application, a process, a service, an electronic signature, or any other entity or attribute associated with one or more components of system environment 100. In some embodiments, identity 112 may be a user requesting to perform a privileged computing operation through computing device 110. As noted above, this may be a privileged computing operation associated with data on computing device 110, target resource 120, and/or privilege management server 130. In some embodiments, computing device 110 may include a database 114, which may be configured to store one or more logs or records associated with privileges of identity 112. For example, this may include strace logs or other log files, as described in further detail below.

Target resource 120 may include any form of remote computing device that may be the target of a privileged computing operation or privileged computing operation request. Examples of network resource 120 may include SQL servers, databases or data structures holding confidential information, restricted-use applications, operating system directory services, access-restricted cloud-computing resources (e.g., an AWS™ or Azure™ server), sensitive IoT equipment (e.g., physical access control devices, video surveillance equipment, etc.) and/or any other computer-based equipment or software that may be accessible over a network. Target resource 120 may include various other forms of computing devices, such as a mobile device (e.g., a mobile phone or tablet), a wearable device (a smart watch, smart jewelry, implantable device, fitness tracker, smart clothing, or head-mounted display, etc.), an IoT device (e.g., a network-connected appliance, vehicle, lighting, thermostat, room access controller, building entry controller, parking garage controller, sensor device, etc.), a gateway, switch, router, portable device, virtual machine, or any other device that may be subject to privileged computing operations. In some embodiments, target resource 120 may be a privileged resource, such that access to the network resource 120 may be limited or restricted. For example, access to the target resource 120 may require a privileged credential (e.g., a password, a username, an SSH key, an asymmetric key, a security or access token, etc.). In some embodiments target resource 120 may not necessarily be a separate device from computing device 110 and may be a local resource. Accordingly, target resource 120 may be a local hard drive, database, data structure, or other resource integrated with computing device 110.

Privilege management server 130 may be configured to monitor and/or manage one or more privileges within system environment 100. For example, privilege management server 130 may manage one or more privileges associated with identity 112 (or computing device 110) required to perform computing operations within system environment 100. In some embodiments, privilege management server 130 may represent a privileged access management (PAM) system or other access management system implemented within system environment 100. Alternatively or additionally, privilege management server 130 may be a security information and event management (SIEM) resource implemented within system environment 100. Privilege management server 130 may be configured to grant, track, monitor, store, revoke, validate, or otherwise manage privileges of various identities within system environment 100. While illustrated as a separate component of system environment 100, it is to be understood that privilege management server 130 may be integrated with one or more other components of system environment 100. For example, in some embodiments, privilege management server 130 may be implemented as part of target network resource 120, computing device 110, or another device of system environment 100.

In some embodiments, privilege management server 130 may serve as a central system for managing the permissions for users or other identities of system environment 100. Accordingly, any user or other identity of system environment 100, such as identity 112, may not hold permissions or privileges themselves. This may include admin or root users, or other identities having strong privileges. Rather, identity 112 may hold or have access to a process of approving a privileged action against the central management system. This central privilege management system may therefore eliminate the risks associated with managing sensitive operations on local configuration files, as described above.

Figure 2:
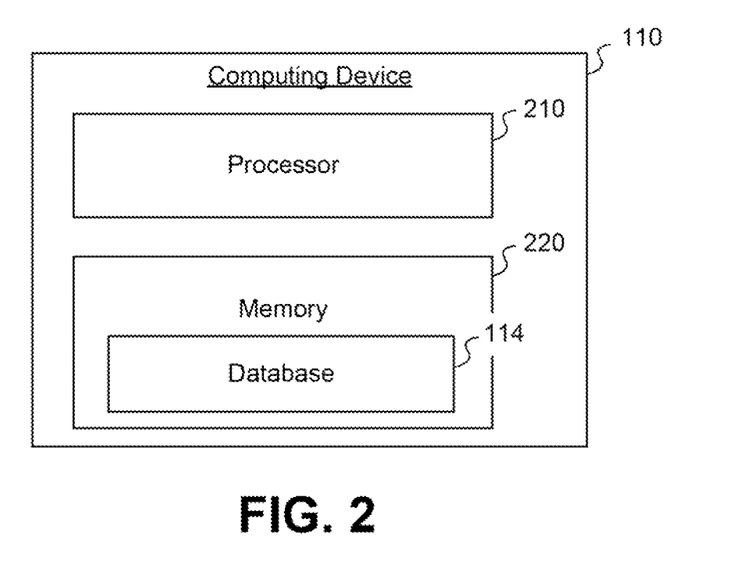
FIG. 2 is a block diagram showing an example computing device, consistent with the disclosed embodiments.

FIG. 2 is a block diagram showing an example computing device 110, consistent with the disclosed embodiments. As described above, computing device 110 may be a device configured to perform (or request to perform) one or more privileged computing operations and may include one or more dedicated processors and/or memories. For example, computing device 110 may include a processor (or multiple processors) 210, and a memory (or multiple memories) 220, as shown in FIG. 2.

Processor 210 may take the form of, but is not limited to, a microprocessor, embedded processor, or the like, or may be integrated in a system on a chip (SoC). Furthermore, according to some embodiments, processor 210 may be from the family of processors manufactured by Intel®, AMD®, Qualcomm®, Apple®, NVIDIA®, or the like. Processor 210 may also be based on the ARM architecture, a mobile processor, or a graphics processing unit, etc. The disclosed embodiments are not limited to any particular type of processor configured in computing device 110.

Memory 220 may include one or more storage devices configured to store instructions used by the processor 210 to perform functions related to computing device 110 described herein. The disclosed embodiments are not limited to particular software programs or devices configured to perform dedicated tasks. For example, the memory 220 may store a single program, such as a user-level application, that performs the functions associated with the disclosed embodiments, or may comprise multiple software programs. Additionally, the processor 210 may, in some embodiments, execute one or more programs (or portions thereof) remotely located from computing device 110. Furthermore, memory 220 may include one or more storage devices configured to store data for use by the programs. Memory 220 may include, but is not limited to a hard drive, a solid state drive, a CD-ROM drive, a transient or temporary storage device (e.g., a random-access memory ("RAM")), a peripheral storage device (e.g., an external hard drive, a USB drive, etc.), a network drive, a cloud storage device, or any other storage device.

In some embodiments, memory 220 may include a database 114 as described above. Database 114 may be configured to store data associated with privilege(s) of identity 112. For example, this may include a log file or other data indicating one or more events leading identity 112 to acquire or hold a privilege associated with a privileged computing operation. Database 114 may be included on a volatile or non-volatile, magnetic, semiconductor, tape, optical, removable, non-removable, or other type of storage device or tangible or non-transitory computer-readable medium. Database 114 may also be part of computing device 110 or separate from computing device 110. When database 114 is not part of computing device 110, computing device 110 may exchange data with database 114 via a communication link. Database 114 may include one or more memory devices that store data and instructions used to perform one or more features of the disclosed embodiments. Database 114 may include any suitable databases, ranging from small databases hosted on a workstation to large databases distributed among data centers. Database 114 may also include any combination of one or more databases controlled by memory controller devices (e.g., server(s), etc.) or software. For example, database 114 may include document management systems, Microsoft SQL™ databases, SharePoint™ databases, Oracle™ databases, Sybase™ databases, other relational databases, or non-relational databases, such as mongo and others.

Computing device 110 may include various security components configured to receive or identify requests to perform privileged computing operations, validate privileges associated with the requests, and perform the privileged computing operations in a secure manner. For example, a request or attempt to perform a privileged computing operation may initiate a "zero-time capability" mechanism to take responsibility for performing the privileged operation in a hardened, secure, and much more monitored environment than an original process requesting to perform the privileged computing operation. Accordingly, a less secure process may not hold any privileges required to perform the privileged computing operation itself. Rather, the process may receive an output of a requested privileged computing operation in a secure manner. In some embodiments, at least a portion of the secured process may be performed in a kernel environment of computing device 110.

Figure 3:
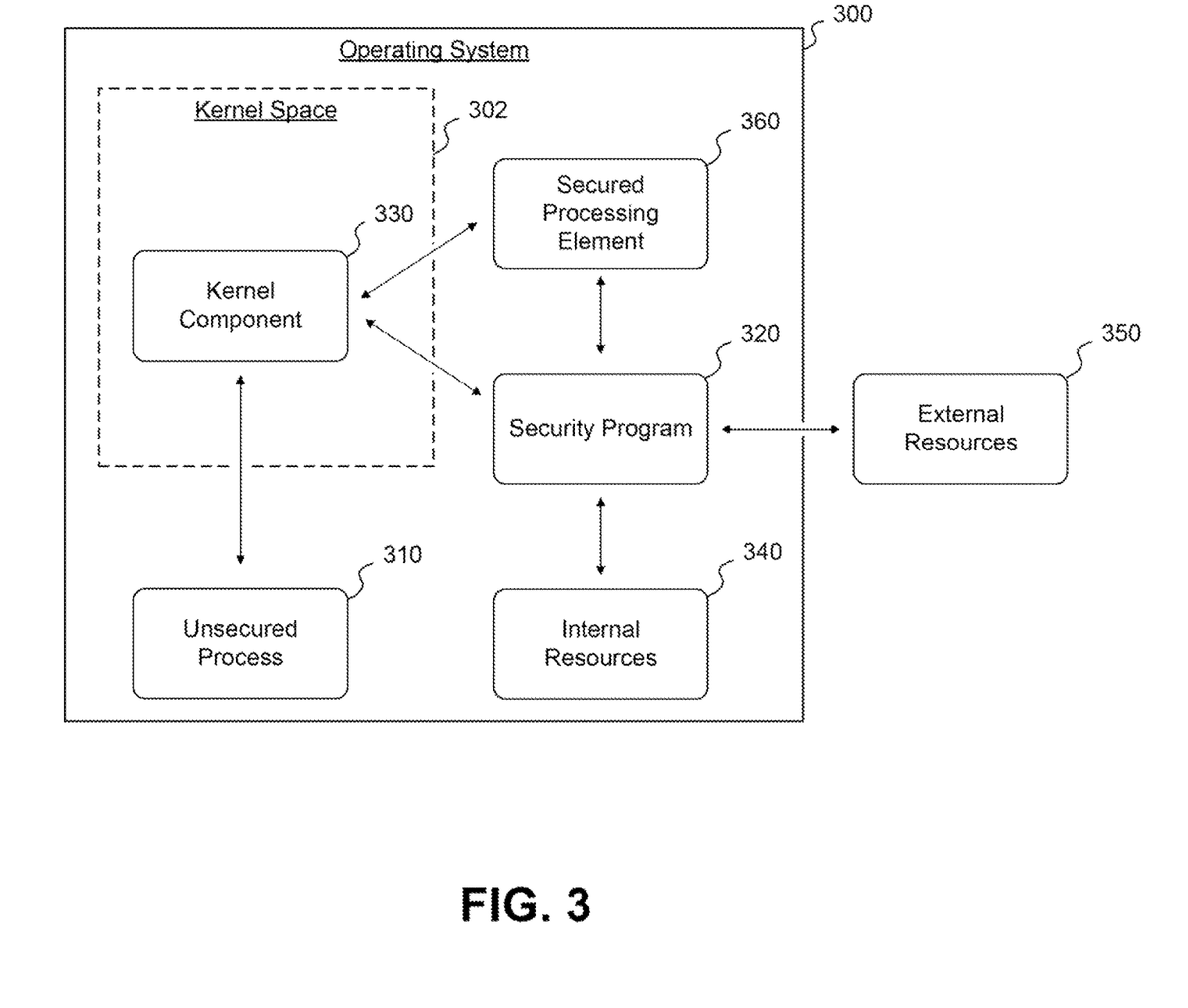
FIG. 3 is a block diagram showing an example operating system, consistent with the disclosed embodiments.

FIG. 3 is a block diagram showing an example operating system 300, consistent with the disclosed embodiments. Operating system 300 may represent an operating system of a computing device through which a privileged computing operation is performed (or requested to be performed). For example, operating system 300 may be an operating system of computing device 110 and thus may be executing using processor 210 and/or memory 220, as described above. Operating system 300 may include various types of operating platforms, such as Microsoft Windows™, Apple macOS™, Apple iOS™, Google Android™, Linux™, or the like. Operating system 300 may include a kernel space 302, as shown in FIG. 3. Kernel space 302 may represent a protected space of operating system 300, which may be reserved for running a privileged kernel and one or more kernel components or extensions. For example, operating system 300 may be a Linux™ operating system and a Linux™ kernel may execute within kernel space 302. Operating system 300 may further include a user space dedicated for running user applications outside of the system's kernel.

Operating system 300 may include an unsecured process 310. Unsecured process 310 may be any process or application executing on operating system 300 that may request to perform a privileged computing operation. This may include a request to access a file, modify a file, delete a file (or a portion of a file), obtain a new credential, add a new user or user group, mount an image file, execute a kernel space code, perform network-related tasks, or any other action that may require privileges. The target of the privileged computing operation may be local to computing device 110 or may be remote (e.g., at target resource 120, etc.), as described above.

Consistent with the disclosed embodiments, identity 112 may operate computing device 110 to perform a privileged computing operation through unsecured process 310 and, as a result, unsecured process 310 may request to perform the privileged computing operation. Accordingly, unsecured process 310 may be a product of an executable file that was executed by a privileged user or process, such as identity 112. Alternatively or additionally, unsecured process 310 itself may be the product of running a file with privileges. While unsecured process 310 is described as being unsecured, this may refer to the process being unsecured from the perspective of the various other or additional security components of operating system 300 described herein. It is to be understood that this does not necessarily mean that unsecured process 310 is entirely unsecured. For example, unsecured process 310 may be associated with various other layers of security apart from the embodiments described herein.

According to existing techniques, unsecured process 310 may request to perform the privileged computing operation itself. Accordingly, unsecured process 310 may assert a privilege associated with the privileged computing operation and, based on a validation of the privilege, unsecured process 310 may be allowed to perform the privileged computing operation. The embodiments disclosed herein, however, provide additional layers of security for validating the privileges of unsecured process 310 (or identity 112) and performing the privileged computing operation separate from unsecured process 310. In particular, a security program 320 executing in operating system 300 may be configured to determine whether to allow the privileged computing operation to take place and, based on a determination that the privileged computing operation should be allowed, cause the privileged computing operation to be performed. As a result, an output of the privileged computing operation may be provided to unsecured process 310.

In some embodiments, a request to perform a privileged computing operation may be received, intercepted, or otherwise accessed directly by security program 320. Alternatively or additionally, a kernel component 330 may be implemented within kernel space 302 and may be configured to capture a system call from unsecured process 310. Kernel component 330 may be any process or element configured to execute in kernel space 302. In some embodiments, kernel component 330 may be a sandboxed program operating in the kernel of operating system 300. For example, this may include a program executing as part of a Berkely Packet Filter (BPF) mechanism for executing code in kernel space 302. In embodiments where operating system 300 is a Linux™ operating system, kernel component 330 may be an extended BPF (eBPF) program. As another example, kernel component 330 may be a dedicated kernel module or other component that can be loaded and executed in kernel space 302. Kernel component 330 may thus capture a system call from unsecured process 310 that requires elevated privileges and may pass it on to security program 320 for further processing. For example, continuing with the Linux™ example, the indication of the request may be passed to security program 320 through a secure computing mode (or "seccomp( )") notification or other user-space notification mechanism.

Security program 320 may be configured to validate the request from unsecured process 310 in various ways. In some embodiments, this may include accessing one or more internal resources 340 and/or one or more external resources 350. Internal resources 340 may include any resources storing data associated with unsecured process 310, identity 112, or the requested privileged computing operation that are local to computing device 110. In some embodiments, this may include database 114, which may include log files or other historical data, as discussed further below. External resources 350 may include any resources storing data associated with unsecured process 310, identity 112, or the requested privileged computing operation that are external to computing device 110. In some embodiments, this may include accessing privilege management server 130, as described further below.

In some embodiments, validating the request to perform the privileged computing operation may include determining whether unsecured process 310 or an identity associated with unsecured process 310 (i.e., identity 112) is associated with the necessary privileges for performing the privileged computing operation. Accordingly, this may include a central authorization step, in which security program 320 accesses privilege management server 130 to verify whether the user, process, or other identity is authorized to perform the operation. In some embodiments, this may include transmitting a validation request to privilege management server 130, which may include information about the requested privileged computing operation as well as information identifying the identity 112 and/or unsecured process 310. Security program 320 may then receive a response from privilege management server 130 indicating whether the privileged computing operation is authorized.

In some embodiments, security program 320 may cause the privileged computing operation to be performed based on the validation through privilege management server 130. Alternatively or additionally, security program 320 may perform one or more audits to verify how identity 112 and/or unsecured process 310 came to be associated with the necessary privileges for performing the privileged computing operation. Accordingly, the disclosed embodiments may allow for further verification of the privileges asserted by identity 112. In some embodiments, this may include a local audit through internal resources 340 in which security program 320 evaluates one or more events that led identity 112 and/or unsecured process 310 to perform the privileged computing operation. For example, this may include accessing a chain of events stored as a log in database 114. In some embodiments, this may include a finite number of events that can be validated by security program 320. This may further include accessing a policy that defines one or more unauthorized events. For example, a policy may define events likely to lead to privilege escalation, and security program 320 may verify through the internal resources 340 that no events defined by the policy occurred.

Alternatively or additionally, this may include an external audit (e.g., through external resources 350) in which security program 320 evaluates one or more events that led identity 112 and/or unsecured process 310 to perform the privileged computing operation. For example, this may include identifying one or more events that may indicate that identity 112 obtained the privilege improperly. For example, this may include an audit of locations through which identity 112 accessed system environment 110, timings at which identity 112 accessed system environment 110, a chain of events leading to a privilege being granted, or the like. Additional details regarding auditing events leading to a privileged computing operation are provided below with respect to FIG. 4.

In instances where the requested privileged computing operation was part of a successfully validated request, security program 320 may cause the privileged computing operation to be performed. In some embodiments, this may include security program 320 performing the privileged computing operation or authorizing unsecured process 310 to perform the privileged computing operation. Alternatively or additionally, the disclosed embodiments may include the implementation of a secured processing element 360 configured to perform the requested privileged computing operation. Accordingly, security program 320 may pass one or more parameters needed to perform the privileged computing operation to secured processing element 360.

Secured processing element 360 may be any process capable of holding the necessary privileges for performing a privileged computing operation in secure manner. In some embodiments, secured processing element 360 may be a zero-time capability mechanism, which may be a hardened virtual environment holding the minimum needed capabilities to perform a given task. For example, secured processing element 360 may be virtual execution instance, such as a virtual machine or container. The virtual execution instance may be spun up on demand on a just-in time basis. For example, this may include spinning up a new virtual machine or container instance based on the request to perform the privileged computing operation, based on a successful validation of the request, or the like. Alternatively or additionally, this may include using an existing virtual machine or container instance.

Secured processing element 360 may be granted privileges necessary for performing the privileged operation according to a least privilege access principle. Accordingly, the privileges held by secured processing element 360 may be dynamically adjusted according to the particular privileged computing operation. Notably, by granting privileges to secured processing element 360, unsecured process 310 may never be granted the privileges necessary to perform the privileged computing operation, which may prevent unwanted privilege escalation or other malicious activity via unsecured process 310. Further, secured processing element 360 may operate in a capability-aware mode, in which the capabilities of processing element 360 are adjusted dynamically in accordance with the relevant system call captured by kernel component 330. For example, this may include dynamically setting and removing capabilities such as CAP_CHOWN, CAP_KILL, CAP_SYS_ADMIN, or various other Linux™ capabilities. Accordingly, secured processing element 360 may further operate on a least capability basis to further reduce the likelihood of malicious activity.

Once the privileged computing operation has been performed, an output of the operation may be provided to unsecured process 310. In some embodiments, this may be through the initial user space to kernel space connection. In other words, secured processing element 360 may provide the result of the operation to kernel component 330 either directly or via security program 320. The result may then be forwarded to unsecured process 310 in response to the initial system call.

In instances where the requested privileged computing operation is not successfully validated, security program 320 may perform one or more control operations associated with the request or with identity 112 or unsecured process 310. For example, this may include denying the request from unsecured process 310 to prevent the privileged computing operation from being performed. In some embodiments, this may further include terminating unsecured process 310. Security program 320 may perform various other security measures, such as generating an alert (which may identify identity 112, the requested privileged computing operation, and/or unsecured process 310), revoking a privilege associated with identity 112, requiring a credential of identity 112 to be rotated, or various other security control operations.

Figure 4:
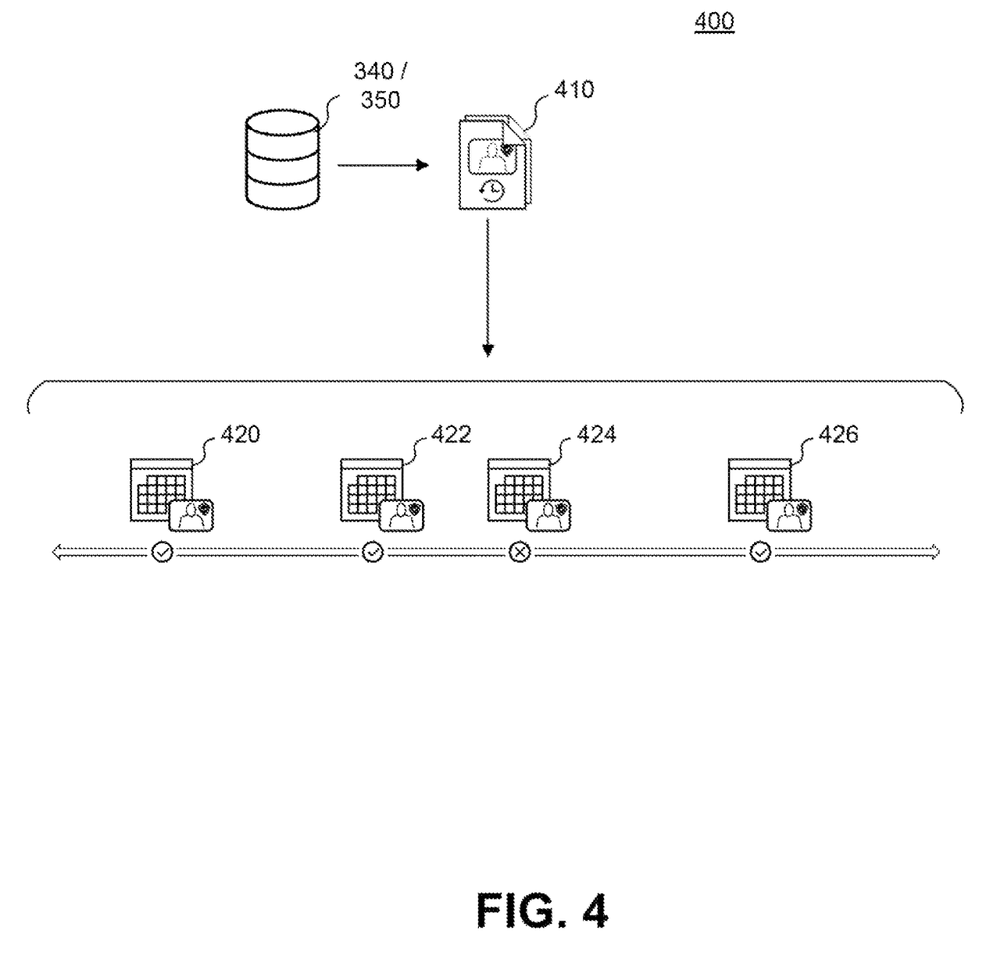
FIG. 4 is a block diagram illustrating an example process for auditing a privilege asserted by an identity, consistent with the disclosed embodiments.

As described above, security program 320 may be configured to perform one or more audits as part of a process for validating a request to perform a privileged computing operation. FIG. 4 is a block diagram illustrating an example process 400 for auditing a privilege asserted by identity 112, consistent with the disclosed embodiments. For example, process 400 may represent a process in which security program 320 accesses historical data 410, which may indicate at least one event leading to identity 112 being associated with a privilege. Process 400 may represent either an internal audit or an external audit as described above. Accordingly, security program 320 may access historical data 410 from one or more of internal resources 340 and external resources 350.

Historical data 410 may be any data representing a history of events associated with identity 112. In some embodiments, historical data 410 may be represented as one or more log files storing events associated with one or more privileges. In some embodiments, historical data 410 may be particular to identity 112, unsecured process 310, a privilege required to perform a privileged computing operation, or any other specific subset of data. Alternatively or additionally, historical data 410 may be a larger set of data, and auditing historical data 410 may include searching or filtering for events associated with one or more of identity 112, unsecured process 310, a privilege required to perform a privileged computing operation, or any other characteristics of data.

As shown in FIG. 4, historical data 410 may include an indication of various events 420, 422, 424, and 426. In some embodiments, events 420, 422, 424, and 426 may be local events (e.g., stored in database 114). Accordingly, events 420, 422, 424, and 426 may represent various events leading to the requested privileged computing operation, such as a login event of identity 112, an authentication of identity 112, various interactions between identity 112 and computing device 110 or its applications, or the like. Alternatively or additionally, events 420, 422, 424, and 426 may be external events (e.g., stored in a database associated with privilege monitoring server 130 or target resource 120). Accordingly, events 420, 422, 424, and 426 may represent various external events leading to the requested privileged computing operation, such as a privilege begin granted, events prior to a privilege being granted, other privileges associated with identity 112, or any other information that may be relevant to determine whether a privilege was property granted. In some embodiments, events 420, 422, 424, and 426 may be a combination of local events and external events collected from different resources. Accordingly, rather than a strictly local audit or a strictly external audit (which may each be performed separately), process 400 may represent a comprehensive audit of various types of events.

In some embodiments, process 400 may include identifying at least one event indicating identity 112 is improperly associated with a privilege. For example, this may include identifying event 424, as indicated in FIG. 4. In some embodiments, the improper association with the privilege may be identified based on the occurrence of the event itself. For example, event 424 may violate a security policy associated with system environment 100. In some embodiments, the timing of event 424, the sequence of two or more of events 420, 422, 424, and 426, the occurrence of event 424 without the occurrence of another expected event, or various other properties of events 420, 422, 424, and 426 may indicate identity 112 is improperly associated with a privilege. In some embodiments, an indication that identity 112 is improperly associated with a privilege may be based on the lack of an expected event, rather than the inclusion of a particular event, such as event 424. For example, this may include the lack of a strong password or other credential (e.g., biometrics, etc.) of identity 112 being entered, or the like.

Based on the detection of event 424, security program 320 may determine that the privilege is improperly associated with identity 112 and may deny the request. Otherwise, if events 420, 422, 424, and 426 do not indicate that the privilege is improperly associated with identity 112, security program 320 may cause the privileged computing event to be performed, as described above. In some embodiments, events may be detected with varying degrees of indications of malicious activity and a control action may be selected based on the degree to which the event indicates potentially malicious activity. For example, event 424 may indicate an abnormality but may not necessarily warrant denying the privileged computing operation. Accordingly, security program 320 may cause the privileged computing event to be performed but may also perform a control operation (either before or after causing the privileged computing operation to be performed) such as requesting a credential change of identity 112, requesting the credentials for identity 112, flagging identity 112 for further monitoring, or the like.

Various potential use cases of the disclosed embodiments are described below. It is understood that these cases are provided by way of example and are not intended to be limiting of the present disclosure in any way. In one potential use case, the disclosed embodiments may be implemented to prevent a known sudoedit vulnerability in which a low-privileged user may escalate its privileges to those of a root user. "Sudoedit" refers to a built-in Linux™ command that allows users to securely edit files. In some instances, when running a sudoedit command with the flags -s or -i, the command may not result in an exit with an error. The sudoers policy plugin may not remove the escape characters, resulting instead in reading beyond the last character of a string if it ends with an un-escaped backslash character. This vulnerability may allow attackers to run a random code, which in turn leads to running a command with root privilege without authentication.

The disclosed embodiments may address this vulnerability by catching a point in time associate with a use of sudoedit's setuid permissions. Although the sudoedit command may seem legitimate (assuming this vulnerability is not known) an audit of an event history by security program 320 may indicate that a step is missing from the event history prior to the privileged operation being performed. In particular, the event history may be missing an event in which the user enters a password prior to the privileged operation being performed. Accordingly, when a local audit reveals that the privileged application has not been verified at any stage against a valid password, as would be expected when using the sudoedit binary, security program 320 may detect that an illegitimate process is being performed.

In another use case, the disclosed embodiments may be used to determine that an entity gained access as a root user from a file or other source, rather than through a privileged access management system, such as privilege management server 130. For example, in the case of either a local or remote connection to a server, or a sudo activation when inserting a password, the disclosed systems can handle the login or sudo request and verify there's a correlation with a privileged access management system that supplied the credentials and the connection. Accordingly, the system may determine whether the privilege is properly associated with the entity.

As yet another use case, the disclosed embodiments may be used to detect access to a file with capabilities due to a logical vulnerability in OS-level container virtualization packages. For example, in some embodiments, container images may be saved as file systems accessible to low-privileged users. Accordingly, a capable file on a container may remain on the host as well as the default container. Accordingly, a low-privileged user on the host may be able to use these "container related capable files" to elevate its privileges.

In this case, a dedicated policy may be built to examine the local logs of the system and identify an illegitimate elevated process. This process may be a result of low-privileged user, which is not part of the relevant container, executing the capable file from the exposed container file system. Based on events not complying with the specific policy, a privilege escalation by the low-privileged user may be identified. The various use cases described above are provided by way of example and are not exhaustive or limiting of the capabilities of the disclosed embodiments.

Figure 5:
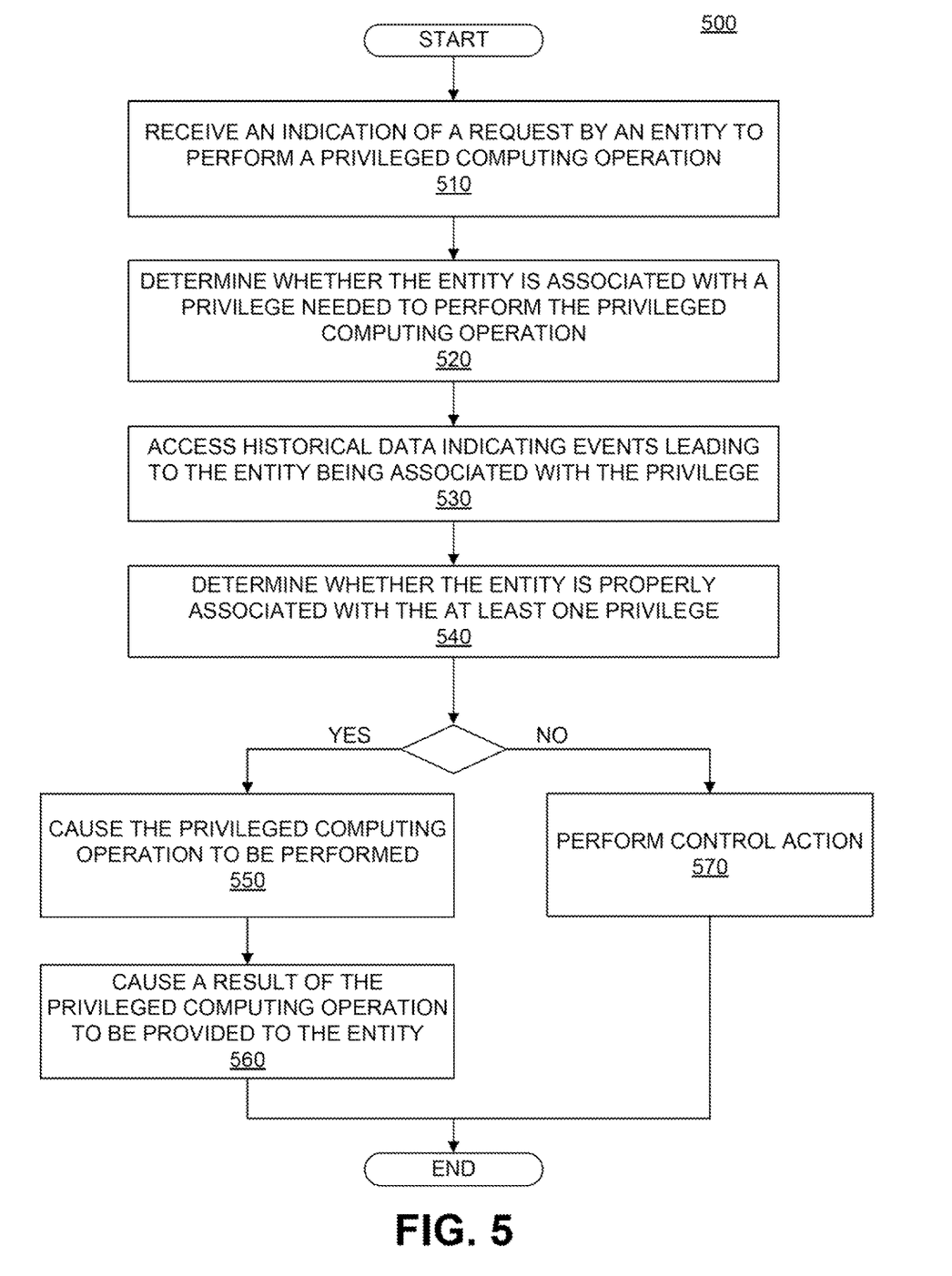
FIG. 5 is a flowchart showing an example process for securely performing privileged computing actions, consistent with the disclosed embodiments.

FIG. 5 is a flowchart showing an example process 500 for securely performing privileged computing actions, consistent with the disclosed embodiments. Process 500 may be performed by at least one processor of a computing device, such as processor 210, as described above. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 500. Further, process 500 is not necessarily limited to the steps shown in FIG. 5, and any steps or processes of the various embodiments described throughout the present disclosure may also be included in process 500, including those described above with respect to, for example, FIGS. 3 and 4.

In step 510, process 500 may include receiving an indication of a request by an entity to perform a privileged computing operation. The entity may include one or more of a user, a process, an account, or any other entity that may be associated with one or more privileges, such as identity 112 or unsecured process 310. For example, identity 112 may be a user attempting to perform a privileged computing operation through computing device 110, which may be requested by unsecured process 310. Accordingly, the entity may be the user requesting the privilege, an account associated with the user, the process requesting the operation, or any other entity that may hold a privilege for performing the privileged computing operation.

In some embodiments, the indication of the request may be received from a dedicated module or a sandboxed program executing inside an operating system kernel. For example, the indication of the request may be received from kernel component 330, which may capture or intercept the request in a kernel space of an operating system. Kernel component 330 may then provide the indication of the request via a seccomp( ) notification or another form of kernel space to user space connection.

In step 520, process 500 may include determining whether the entity is associated with at least one privilege needed to perform the privileged computing operation. In some embodiments, this may include accessing a privilege management server. For example, step 520 may include accessing privilege management server 130, which may store associations between various entities and assigned privileges.

In step 530, process 500 may include accessing historical data indicating at least one event leading to the entity being associated with the at least one privilege. For example, this may include accessing historical data 410, which may include indications of events 420, 422, 424, and 426, as described above. In some embodiments, the historical data may include data stored in a database local to a system associated with the entity. For example, this may include database 114, as described above. Alternatively or additionally, accessing the historical data may include accessing a system external to a system associated with the entity. In some embodiments, the system external to the system associated with the entity may be configured to assign the at least one privilege. For example, this may include privilege management system 130. The system external to the system associated with the entity may include any other external resource that may store historical data associated with the at least one privilege or the entity. In some embodiments, step 530 may be performed based on a determination that the entity is associated with the at least one privilege from step 520.

In step 540, process 500 may include determining, based on the historical data, whether the entity is properly associated with the at least one privilege. In other words, in addition to determining the entity holds or is otherwise associated with the privilege, process 500 may further include determining whether the privilege is valid for the entity. This may be performed in various ways based on the historical data. In some embodiments, this may include validating the at least one event accessed in step 530. For example, this may include determining whether the events leading to the entity gaining the privilege or asserting the privilege are valid. In some embodiments, determining whether the entity is properly associated with the at least one privilege may include identifying at least one expected event not included in the historical data. For example, this may include an event in which a user enters a credential prior to performing the privileged computing operation. In some embodiments, determining whether the entity is properly associated with the at least one privilege may include accessing at least one policy indicating an expected series of events leading to association with the privilege.

Based on a determination in step 540 that the entity is properly associated with the at least one privilege, process 500 may include a step 550 of causing the privileged computing operation to be performed by a secured processing element. For example, this may include causing secured processing element 360 to perform the privileged computing operation, as described above. Accordingly, causing the privileged computing operation to be performed by the secured processing element may include providing at least one parameter associated with the privileged computing operation to the secured processing element. In some embodiments, the secured processing element is configured to execute in a virtual execution instance. For example, this may include performing the privileged computing operation a virtual machine or virtual container. The virtual execution instance may be an existing instance, or may be spun up as needed.

As described above, the secured processing element may be assigned privileges needed to perform the privileged computing operation. In some embodiments, the secured processing element may have root or administrative privileges to perform any privileged computing operation. Alternatively or additionally, the secured processing element may be dynamically assigned privileges specific to the privileged computing operation. For example, causing the privileged computing operation to be performed by a secured processing element may include causing the secured processing element to gain the at least one privilege. Process 500 may further include causing the secured processing element to lose the at least one privilege after performing the privileged computing operation. In some embodiments, be a "zero-time capability" mechanism, which may hold the minimum needed capabilities to perform the task. Accordingly, causing the privileged computing operation to be performed by a secured processing element may include causing the secured processing element to gain at least one capability for performing the privileged computing operation. Process 500 may further include causing the secured processing element to lose the at least one capability after performing the privileged computing operation.

In step 560, process 500 may include causing a result of the privileged computing operation performed by the secured processing element to be provided to the entity. For example, this may include providing a result generated by secured processing element 360 to unsecured process 310. In some embodiments, the result may be provided through the same connection as the indication of the request was received in step 510. For example, the result may be provided to kernel component 330 through a kernel space to user space connection and then provided to unsecured process 310.

Based on a determination in step 540 that the entity is not properly associated with the at least one privilege, process 500 may include a step 570 of performing at least one control action. For example, this may include denying the request, terminating a process associated with the privileged computing operation (e.g., unsecured process 310), generating an alert identifying the entity, or various other control actions described in further detail above.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for securely performing privileged computing actions, the operations comprising:
   receiving an indication of a request by an entity to perform a privileged computing operation, the request being captured using a kernel component;
   determining whether the entity is associated with at least one privilege needed to perform the privileged computing operation;
   based on a determination that the entity is associated with the at least one privilege, accessing historical data indicating a plurality of events associated with the entity;
   identifying, within the plurality of events, at least one event indicating how the entity obtained the at least one privilege;
   determining, based on the at least one event, whether the entity is properly associated with the at least one privilege;
   based on the determination that the entity is properly associated with the at least one privilege, causing the privileged computing operation to be performed by a secured processing element; and
   causing a result of the privileged computing operation performed by the secured processing element to be provided to the entity.

2. The non-transitory computer readable medium of claim 1, wherein determining whether the entity is properly associated with the at least one privilege includes accessing a privilege management server.

3. The non-transitory computer readable medium of claim 1, wherein determining whether the entity is properly associated with the at least one privilege includes validating the at least one event.

4. The non-transitory computer readable medium of claim 1, wherein determining whether the entity is properly associated with the at least one privilege includes identifying at least one expected event not included in the historical data.

5. The non-transitory computer readable medium of claim 1, wherein determining whether the entity is properly associated with the at least one privilege includes accessing at least one policy indicating an expected series of events leading to association with the privilege.

6. The non-transitory computer readable medium of claim 1, wherein the historical data includes data stored in a database local to a system associated with the entity.

7. The non-transitory computer readable medium of claim 1, wherein the accessing the historical data includes accessing a system external to a system associated with the entity.

8. The non-transitory computer readable medium of claim 7, wherein the system external to the system associated with the entity is configured to assign the at least one privilege.

9. The non-transitory computer readable medium of claim 1, wherein causing the privileged computing operation to be performed by the secured processing element includes providing at least one parameter associated with the privileged computing operation to the secured processing element.

10. The non-transitory computer readable medium of claim 1, wherein the entity is at least one of a user or a process executing on a computing device.

11. A computer-implemented method for securely performing privileged computing actions, the method comprising:
    receiving an indication of a request by an entity to perform a privileged computing operation, the request being captured using a kernel component;
    determining whether the entity is associated with at least one privilege needed to perform the privileged computing operation;
    based on a determination that the entity is associated with the at least one privilege, accessing historical data indicating a plurality of events associated with the entity;
    identifying, within the plurality of events, at least one event indicating how the entity obtained the at least one privilege;
    determining, based on the at least one event, whether the entity is properly associated with the at least one privilege;
    based on a determination that the entity is properly associated with the at least one privilege, causing the privileged computing operation to be performed by a secured processing element; and
    causing a result of the privileged computing operation performed by the secured processing element to be provided to the entity.

12. The computer-implemented method of claim 11, further comprising, based on a determination that the entity is improperly associated with the at least one privilege, denying the request.

13. The computer-implemented method of claim 11, further comprising, based on a determination that the entity is improperly associated with the at least one privilege, terminating a process associated with the privileged computing operation.

14. The computer-implemented method of claim 11, further comprising, based on a determination that the entity is improperly associated with the at least one privilege, generating an alert identifying the entity.

15. The computer-implemented method of claim 11, wherein causing the privileged computing operation to be performed by a secured processing element includes causing the secured processing element to gain the at least one privilege.

16. The computer-implemented method of claim 15, further comprising causing the secured processing element to lose the at least one privilege after performing the privileged computing operation.

17. The computer-implemented method of claim 11, wherein causing the privileged computing operation to be performed by a secured processing element includes causing the secured processing element to gain at least one capability for performing the privileged computing operation.

18. The computer-implemented method of claim 11, further comprising causing the secured processing element to lose the at least one capability after performing the privileged computing operation.

19. The computer-implemented method of claim 11, wherein the secured processing element is configured to execute in a virtual execution instance.

20. The computer-implemented method of claim 11, wherein the kernel component includes at least one of a dedicated module or a sandboxed program executing inside an operating system kernel.

\* \* \* \* \*